(12) United States Patent
Lutjen et al.

(10) Patent No.: US 10,094,225 B2
(45) Date of Patent: Oct. 9, 2018

(54) CORE COMPONENT HAVING TOROIDAL STRUCTURES

(71) Applicant: United Technologies Corporation, Hartford, CT (US)

(72) Inventors: Paul M. Lutjen, Kennebunkport, ME (US); Gary L. Grogg, South Berwick, ME (US)

(73) Assignee: United Technologies Corporation, Hartford, CT (US)

( * ) Notice: Subject to any disclaimer, the term of this patent is extended or adjusted under 35 U.S.C. 154(b) by 373 days.

(21) Appl. No.: 15/005,327

(22) Filed: Jan. 25, 2016

(65) Prior Publication Data

US 2017/0211392 A1     Jul. 27, 2017

(51) Int. Cl.

| F01D 5/08 | (2006.01) |
|---|---|
| F01D 5/18 | (2006.01) |
| B22C 9/10 | (2006.01) |
| B22C 7/02 | (2006.01) |
| B22C 9/04 | (2006.01) |
| B22F 5/04 | (2006.01) |

(Continued)

(52) U.S. Cl.
CPC ............... *F01D 5/18* (2013.01); *B22C 7/02* (2013.01); *B22C 9/04* (2013.01); *B22C 9/10* (2013.01); *B22C 9/103* (2013.01); *B22C 9/108* (2013.01); *B22F 5/04* (2013.01); *F01D 5/187* (2013.01); *F01D 9/065* (2013.01); *B22F 2005/103* (2013.01); *F05D 2230/21* (2013.01);

(Continued)

(58) Field of Classification Search
CPC combination set(s) only.
See application file for complete search history.

(56) References Cited

U.S. PATENT DOCUMENTS

| 6,582,584 B2 * | 6/2003 | Lee .................... B23H 9/00 205/640 |
|---|---|---|
| 8,393,381 B2 * | 3/2013 | Graham ............... B22C 9/04 134/3 |

(Continued)

FOREIGN PATENT DOCUMENTS

| EP | 1283327 A2 | 2/2003 |
|---|---|---|
| WO | WO2015094531 A1 | 6/2015 |

OTHER PUBLICATIONS

Extended European Search Report for EP Application No. 17152799.7, dated Nov. 20, 2017, 15 Pages.

(Continued)

*Primary Examiner* — Igor Kershteyn
*Assistant Examiner* — Jason Fountain
(74) *Attorney, Agent, or Firm* — Kinney & Lange, P.A.

(57) ABSTRACT

According to one embodiment of this disclosure a core includes a first end and a second end spaced generally opposite from the first end. The core further includes a stacking axis defined between the first end and second end and a first toroidal structure located between the first end and the second end. The first toroidal structure includes a first passage extending through the first toroidal structure in a first direction that is perpendicular to and passes through the stacking axis. The core also includes a second toroidal structure located between the first toroidal structure and the second end. The second toroidal structure includes a second passage extending through the second toroidal structure in a second direction. The first direction and the second direction are oriented along the stacking axis at a non-zero degree angle with respect to each other.

20 Claims, 16 Drawing Sheets

(51) Int. Cl.
  *F01D 9/06* (2006.01)
  *B22F 5/10* (2006.01)
(52) U.S. Cl.
  CPC ...... *F05D 2230/22* (2013.01); *F05D 2230/31* (2013.01); *F05D 2240/11* (2013.01); *F05D 2240/81* (2013.01); *F05D 2250/20* (2013.01); *F05D 2250/231* (2013.01); *F05D 2250/24* (2013.01); *F05D 2250/241* (2013.01); *F05D 2250/27* (2013.01); *F05D 2250/293* (2013.01); *F05D 2250/313* (2013.01); *F05D 2250/75* (2013.01); *F05D 2260/20* (2013.01); *F05D 2260/204* (2013.01); *F05D 2260/221* (2013.01); *F05D 2260/2212* (2013.01); *F05D 2260/2214* (2013.01); *F05D 2300/131* (2013.01)

(56) References Cited

U.S. PATENT DOCUMENTS

2011/0243711 A1 10/2011 Vehr
2016/0312624 A1* 10/2016 Loricco ................. F01D 25/12

OTHER PUBLICATIONS

Partial European Search Report for European Patent Application No. 17152799.7, dated Aug. 18, 2017, 17 pages.
Anonymous, Toroid—Wikipedia, Jan. 20, 2016, XP055387203, retrieved from the Internet: https://en.wikipedia.org/w/index.php?title=Toroid&oldid=700689983.
European Search Report for EP Application No. 17152799.7, dated Apr. 12, 2018, 15 Pages.

* cited by examiner

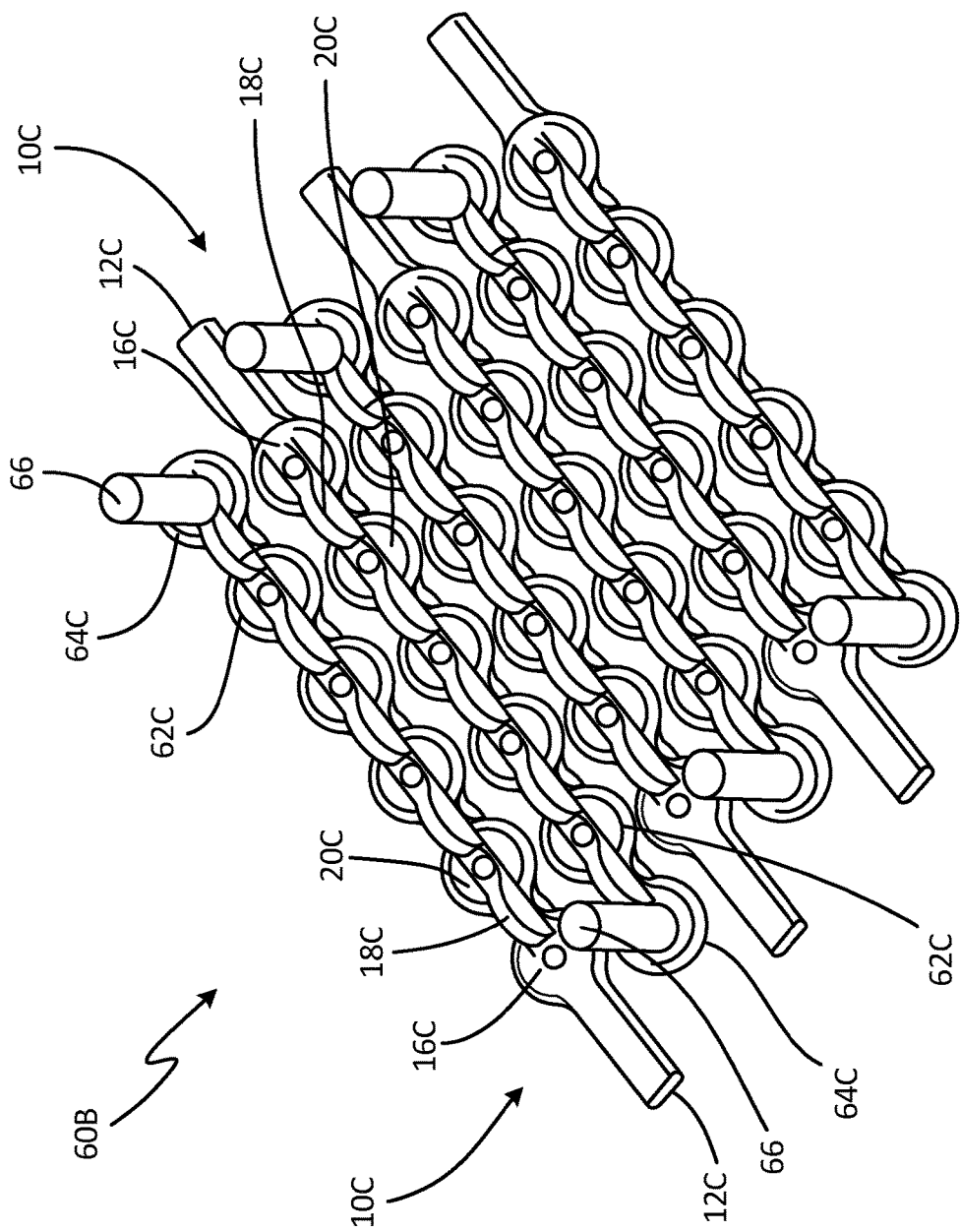

CORE COMPONENT HAVING TOROIDAL STRUCTURES

BACKGROUND

Gas turbine engines generate a tremendous amount of heat during operation. Components of the gas turbine engine, such as turbine rotor blades, stator vanes, and blade outer air seals are directly subjected to heat, which can decrease the service life of the components.

In order to increase the service life of these components it is often necessary to form a flow chamber through the component so that a flow of cooling air can pass through the component to absorb heat generated by the gas turbine engine.

Typically flow chambers are designed to direct air in two dimensions in order to increase the amount of heat that the cooling air can absorb. Given the importance of cooling gas turbine engine components, it is desirable to design a component with a flow chamber, or a core for making such a passage, that can increase the ability of air passing through the component to absorb heat.

SUMMARY

According to one embodiment of this disclosure a core includes a first end and a second end spaced generally opposite from the first end. The core further includes a stacking axis defined between the first end and second end and a first toroidal structure located between the first end and the second end. The first toroidal structure includes a first passage extending through the first toroidal structure in a first direction that is perpendicular to and passes through the stacking axis. The core also includes a second toroidal structure located between the first toroidal structure and the second end. The second toroidal structure includes a second passage extending through the second toroidal structure in a second direction. The first direction and the second direction are oriented along the stacking axis at a non-zero degree angle with respect to each other.

According to yet another embodiment a component for a gas turbine engine includes a first end and a second end generally opposite the first end. The component further includes a flow chamber disposed along a stacking axis between the first end and the second end and defined by an internal surface of the component. The flow chamber includes a first chamber located at the first end and having a substantially toroidal cross section; a second chamber located between the first chamber and the second end and having a toroidal cross section; a first pedestal extending through a central portion of the first chamber in a first direction; and a second pedestal extending through a central portion of the second chamber in a second direction, wherein the first direction and the second direction are oriented at a non-zero degree angle with respect to each other.

According to yet another embodiment a core includes a first end and a second end spaced opposite from the first end. A stacking axis is defined between the first end and the second end. A first disc is located between the first end and the second end. The first disc has a first generally planar surface. A second disc is located between the first disc and the second end. The second disc has a second generally planar surface. The first generally planar surface and the second generally planar surface are oriented along the stacking axis at a non-zero degree angle with respect to each other.

BRIEF DESCRIPTION OF THE DRAWINGS

FIG. 3B is a perspective view showing a plurality of cores arranged together for use in a blade outer air seal.

DETAILED DESCRIPTION

This application is directed towards a core used to create a passage in a component of a gas turbine engine, the resulting component, and methods of forming the core and component. The claims of this application will be better understood when read in light of the drawings and following description.

Figure 1A:
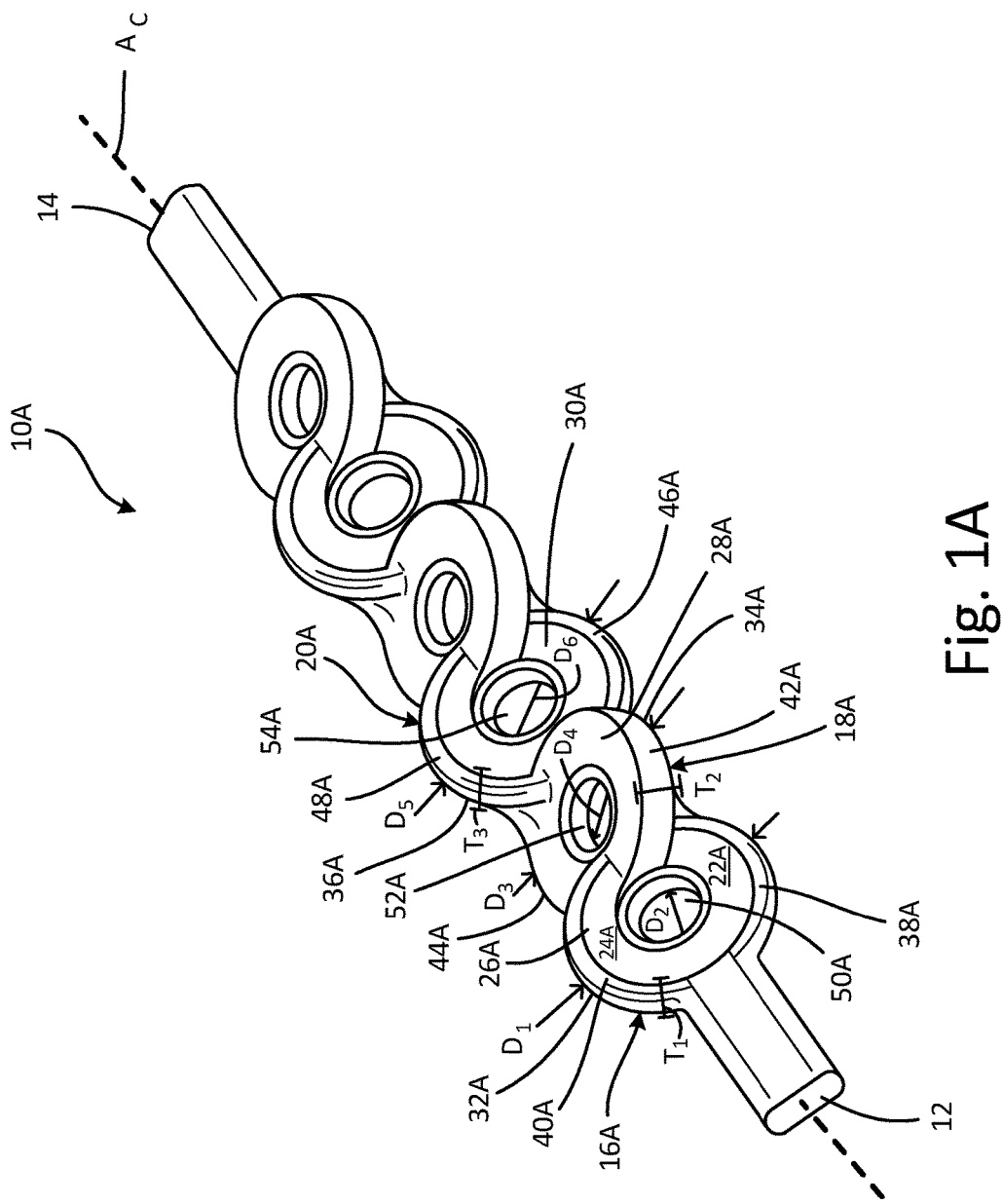
FIG. 1A is a perspective view of an embodiment of a core including a plurality of toroidal structures rotated at a non-zero degree angle with respect to each other.

FIG. 1A is a perspective view of core 10A. FIG. 1A illustrates first end 12 and second end 14 of core 10A. FIG. 1A also illustrates structures 16A, 18A, and 20A, which are illustrated as toroidal structures. FIG. 1A also illustrates first portion 22A and second portion 24A. FIG. 1A also illustrates first planar surfaces 26A, 28A, and 30A as well as second planar surfaces 32A, 34A, and 36A. FIG. 1A further illustrates side surfaces 38A, 40A, 42A, 44A, 46A, and 48A. FIG. 1A additionally illustrates passages 50A, 52A, and 54A.

Core 10A is defined between first end 12 and second end 14. As depicted, stacking axis $A_c$ extends through first end 12 and second end 14. A stacking axis passes through a series of center points of a component and can follow a linear or curvilinear path. As shown in FIG. 1A, stacking axis $A_c$ follows a linear path that passes through a center of each structure 16A, 18A, and 20A. In other embodiments, stacking axis $A_c$ can follow a curvilinear path through each structure 16A, 18A, and 20A. For example, if core 10A has a curved profile to match a profile of an airfoil pressure surface, then stacking axis $A_c$ would follow a curvilinear path through core 10A.

Structures 16A, 18A, and 20A are shown as toroidal structures, which include passages 50A, 52A, and 54A that are disposed and defined along stacking axis $A_c$ between first end 12 and second end 14.

Toroidal structure 16A is located between first end 12 and second end 14, but nearer first end 12. Toroidal structure 16A is substantially rounded to have a toroidal disc shape formed from first portion 22A and second portion 24A. Toroidal structure 16A further includes first planar surface 26A, opposite second planar surface 32A, side surface 38A and side surface 40A. Toroidal structure 16A has a diameter $D_1$ defined between side surface 38A and side surface 40A. Diameter $D_1$ can be sized so as to be suited for its intended application. For example diameter $D_1$ can range from about 0.015 in. (0.381 mm) to about 0.400 in. (10.16 mm). As depicted diameter $D_1$ is approximately 0.270 in. (6.858 mm). Side surface 38A joins first planar surface 26A and second planar surface 32A and defines a thickness $T_1$ that can range from about 0.015 in. to about 0.150 in. As shown, thickness $T_1$ is approximately 0.050 in. (1.27 mm). Although toroidal structure 16A is illustrated as a toroidal-like disc, toroidal structure 16A can take on other shapes. For example, toroidal structure 16A can take on toroidal shapes such as an elongated toroidal disc, toroidal square, a toroidal D-shape, or a toroidal sphere.

Passage 50A extends from first planar surface 26A through stacking axis $A_c$ to second planar surface 32A. Passage 50A has a diameter $D_2$ that is smaller than diameter $D_1$. As shown in FIG. 1A, the ratio of diameter $D_1$ to diameter $D_2$ is about 4:1. This ratio can be larger or smaller in other embodiments. Passage 50A is shown as located generally at the center of toroidal structure 16A. In other embodiments, however, passage 50A can be offset from the center of toroidal structure 16A. As shown, passage 50A is circular. In other embodiments, however, passage 50A can take on additional shapes such as the elliptical shape illustrated in FIGS. 2D and 2E, or a D-shape.

Toroidal structure 18A is located between toroidal structure 16A and second end 14. As illustrated, a portion of toroidal structure 16A and toroidal structure 18A overlap. Toroidal structure 18A is similar to toroidal structure 16A and includes passage 52A, first planar surface 28A, second planar surface 34A, side surface 42A, and side surface 44A. First planar surface 26A and first planar surface 28A, as illustrated, are oriented at a non-zero degree angle with respect to each other. The non-zero degree angle can range from about 10 degrees to about 90 degrees. As shown in FIG. 1A, the non-zero degree angle is approximately 45 degrees. Side surface 42A joins first planar surface 28A and second planar surface 34A and defines a thickness $T_2$ of toroidal structure 18A that can be commensurate with the thickness $T_1$ of toroidal structure 16A.

Toroidal structure 18A is illustrated as a toroidal-like disc, but can take on additional shapes. Toroidal structure 18A has a diameter $D_3$, which is substantially the same as diameter $D_1$. In other embodiments, diameters $D_1$ and $D_3$ can be different from each other. For example, in some embodiments $D_1$ can be twice as large as $D_3$.

Toroidal structure 18A includes passage 52A. Passage 52A extends from first planar surface 28A through stacking axis $A_c$ to second planar surface 34A. Passage 52A has a diameter $D_4$ that is smaller than $D_3$. As is the case with passage 50A, passage 52A has a circular profile, but can take on additional shapes in other embodiments. As illustrated, a central axis of passage 50A and a central axis of passage 52A are oriented at a non-zero degree angle with respect to each other. The non-zero degree angle can range from about 10 degrees to about 90 degrees. As shown, the non-zero degree angle is about 45 degrees. The angle at which passage 50A and passage 52A are oriented can be commensurate with the angle at which toroidal structure 16A and toroidal structure 18A are oriented. Alternatively, the angle at which passage 50A and passage 52A can differ from the angle at which toroidal structure 16A and toroidal structure 18A are oriented.

Core 10A also includes toroidal structure 20A, which is located between toroidal structure 18A and second end 14A. As illustrated, a portion of toroidal structure 18A and toroidal structure 20A overlap. Toroidal structure 20A is similar to toroidal structures 16A and 18A, and includes passage 54A, first planar surface 30A, and second planar surface 36A. Side surface 46A joins first planar surface 30A and second planar surface 36A and defines a thickness $T_3$ of toroidal structure 20A that can be commensurate with the thickness $T_1$ of toroidal structure 16A.

First planar surface 28A and first planar surface 30A are oriented at a non-zero degree angle with respect to each other. The non-zero degree angle can range from about 10 degrees to about 90 degrees. As shown in FIG. 1A, the non-zero degree angle is about 45 degrees. As additionally shown, first planar surface 26A and first planar surface 30A are oriented at a substantially zero degree angle (i.e. parallel) with respect to each other. As with toroidal structure 16A and toroidal structure 18A; toroidal structure 20A is a toroidal disc, but can take on additional shapes. Toroidal structure 20A has a diameter $D_5$, which is substantially the same as diameters $D_1$ and $D_3$. In other embodiments, each of diameters $D_1$, $D_3$, and $D_5$ can be different from each other. For example, in some embodiments $D_1$ can be twice as large as $D_5$. The diameter of toroidal structures 16A, 18A, and 20A can decrease linearly towards second end 14. The decrease in diameter can also be abrupt. For example, diameter $D_1$ and diameter $D_3$ can be substantially equivalent and diameter $D_5$ can be smaller than either diameter $D_1$ or $D_3$.

Toroidal structure 20A includes passage 54A. Passage 54A extends from first planar surface 30A through stacking axis $A_c$ to second planar surface 36A. Passage 54A has a diameter $D_6$ that is smaller than $D_5$. As is the case with passage 50A and passage 52A, passage 54A has a circular profile, but can take on additional shapes in other embodiments. As illustrated, a central axis of passage 50A and a central axis of passage 54A are oriented at a substantially zero degree angle (i.e. parallel) with respect to each other. The angle at which passage 50A and passage 54A are oriented can be commensurate with the angle at which toroidal structure 16A and toroidal structure 20A are oriented. Alternatively, the angle at which passage 50A and passage 54A are oriented can differ from the angle at which toroidal structure 16A and toroidal structure 20A are oriented.

Core component 10A also includes additional toroidal structures, which are located between toroidal structure 20A and second end 14. The additional toroidal structures are structurally similar to toroidal structure 16A, 18A, and 20A.

In this way the pattern of adjacent toroidal structures that are oriented at a non-zero degree angle with respect to each other is continuous from first end 12 to second end 14. Core 10A can include additional toroidal structures or fewer toroidal structures.

As shown in FIG. 1A, each adjacent toroidal structure is oriented at the same non-zero degree with respect to each other. In further embodiments, however, the non-zero degree angle between adjacent toroidal structures can vary across core 10. For example the non-zero degree angle between first planar surface 26A and first planar surface 28A can be a first non-zero degree angle ranging from about 10 degrees to about 90 degrees and the non-zero degree angle between first planar surface 28A and first planar surface 30A can be a second non-zero degree angle, different than the first non-zero degree angle, ranging from about 10 degrees to about 90 degrees.

Figure 1B:
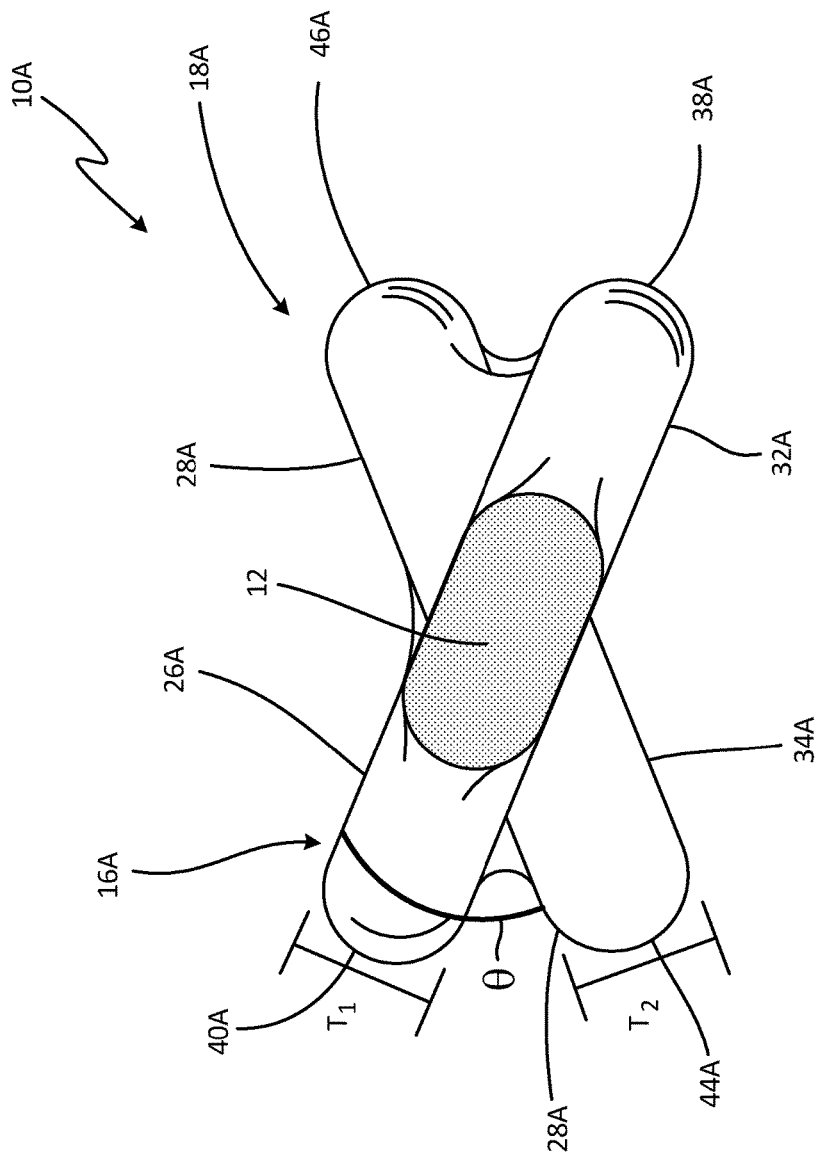
FIG. 1B is an end view of the core of FIG. 1A

FIG. 1B is an end view of core 10A viewed from first end 12 showing toroidal structures 16A and 18A. FIG. 1B shows first planar surface 26A of toroidal structure 16A and first planar surface 28A of toroidal structure 18A oriented at angle θ, with respect to each other, which is an approximately 45 degree angle. As shown in FIGS. 1A and 1B, first planar surface 28A and second planar surface 32A represent two major surfaces that are parallel to each other. In further embodiments, however, first planar surface 28A and second planar surface 32A can be configured so as not to be parallel to each other.

Figure 2A:
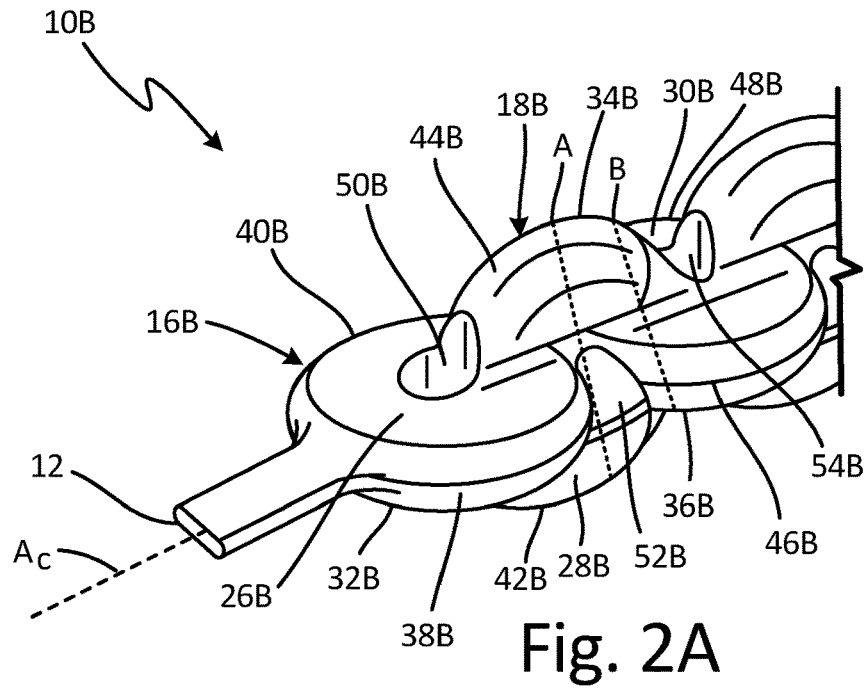
FIG. 2A is a perspective view of another embodiment of a core.

FIG. 2A illustrates core 10B. Core 10B includes many of the same features as core 10A. A difference between the two is that first planar surface 26B and first planar surface 28B, as illustrated, are oriented at about a 90 degree angle with respect to each other. Similarly, passage 50B and passage 52B are oriented at about a 90 degree angle with respect to each other. Additionally, passages 50B, 52B, and, 54B extend through a portion of adjacent toroidal structures 16B and 18B, respectively. More specifically, passage 50B extends from first planar surface 26B to second planar surface 32B and also extends through a portion of side surfaces 44B and 46B. Passage 52B extends from first planar surface 28B to second planar surface 34B and also extends through a portion of side surfaces 38B, 40B, 46B, and 48B. Additionally, passage 54B extends from first planar surface 30B to second planar surface 36B and also extends through a portion of side surfaces 42B and 44B.

Figure 2B:
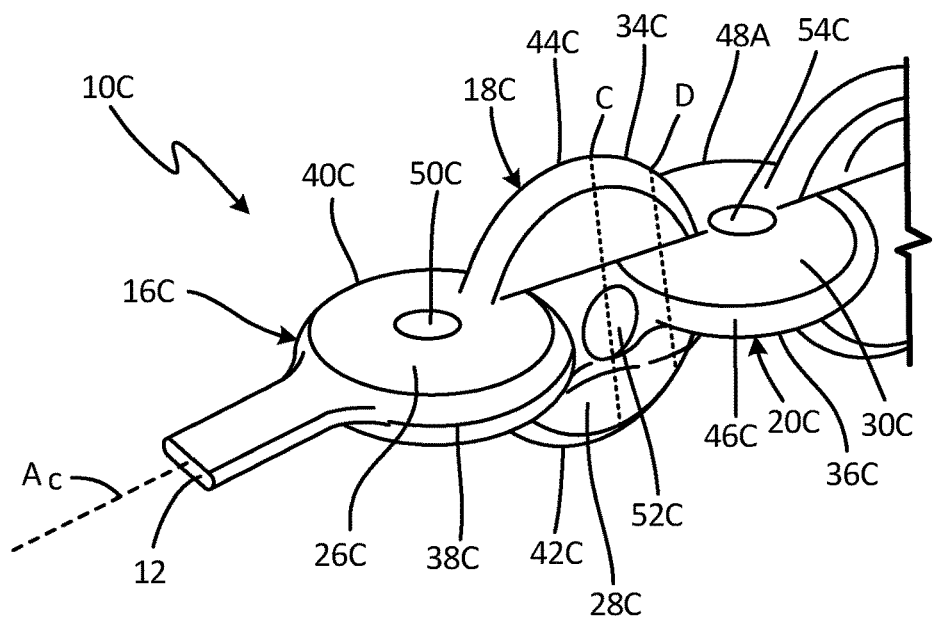
FIG. 2B is a perspective view of another embodiment of a core.

FIG. 2B shows core 10C. Core 10C includes many of the same features as core 10B. A difference between core 10C and core 10B is that the overlap between adjacent toroidal structures 16B, 18B, and 20B is less than those of core 10B. This results in the centers of adjacent passages being spaced farther apart than those of core 10B. This can also be achieved by decreasing the diameter of adjacent passages. Core 10C is designed such that passages 50C, 52C, and 54C do not extend through a portion of adjacent toroidal structures.

Figure 2C:
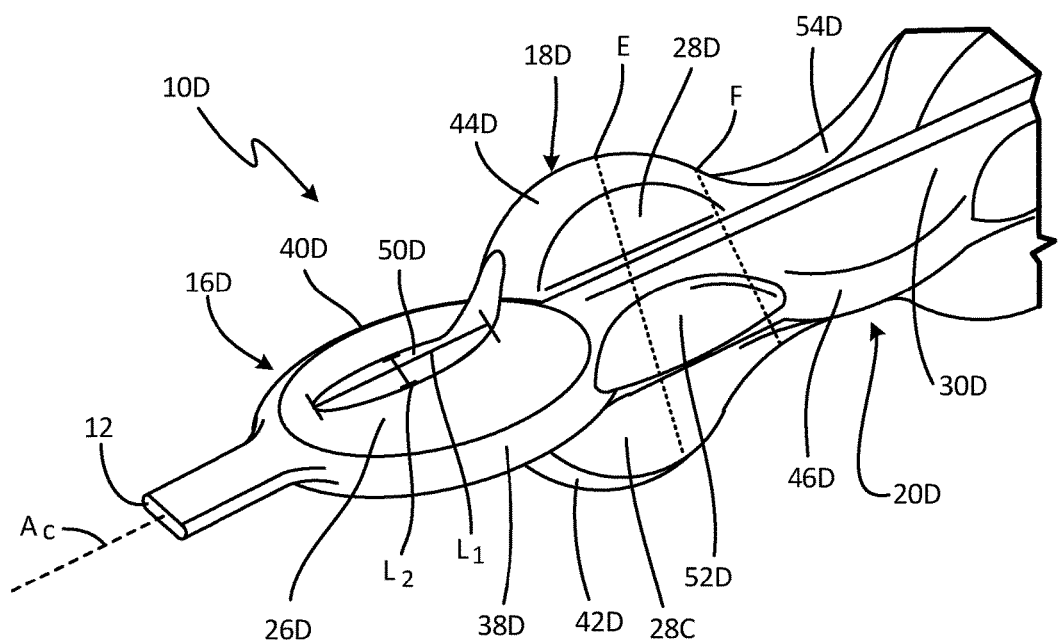
FIG. 2C is a perspective view of another embodiment of a core.
Figure 2D:
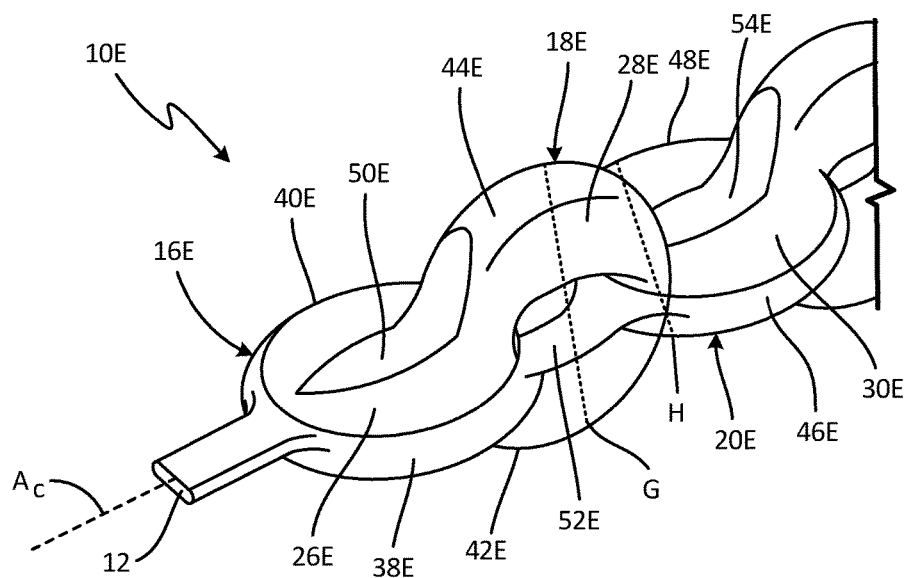
FIG. 2D. is a perspective view of another embodiment of a core.

FIG. 2C shows core 10D, which includes many of the same features as cores 10B-10C. In core 10D, however, passages 50D, 52D, and 54D have an elliptical shape and are defined in part by a major length $L_1$ and a minor length $L_2$. A ratio of the major length $L_1$ to the minor length $L_2$ can range from about 4:1 to about 1:1. As shown in FIG. 2C, the ratio is about 3:1. Similarly, FIG. 2D shows core 10E in which the major lengths and minor lengths of passages 50E, 52E, and 54E are larger than those shown in FIG. 2C. Both FIGS. 2C and 2D show passages extending through a portion of adjacent toroidal structures 16D, 18D, 20D, 16E, 18E, and 20E as described above with respect to FIG. 2A.

Figure 2E:
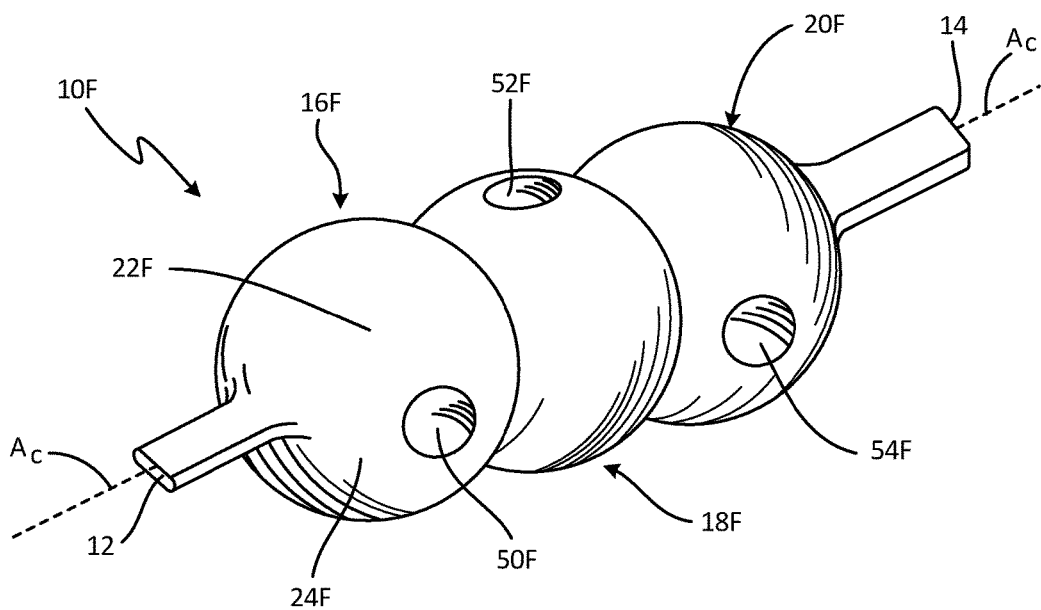
FIG. 2E is a perspective view of another embodiment of a core with toroidal structures having a spherical shape.

FIG. 2E illustrates core 10F. Core 10F includes many of the same features as cores 10A-10E. The principle difference between core 10F and those of cores 10A-10E is that toroidal structures 16F, 18F, and 20F have a spherical toroidal shape. The spherical toroidal shape of toroidal structures 16F, 18F, and 20F is different than the toroidal structures described above, in that first portion 22F and second portion 24F each have a hemi-spherical profile as opposed to the planar disc-shape. Hemispherical first portion 22F and second portion 24F converge to form a sphere with passages 50F, 52F, and 54F extending through the sphere.

Figure 2F:
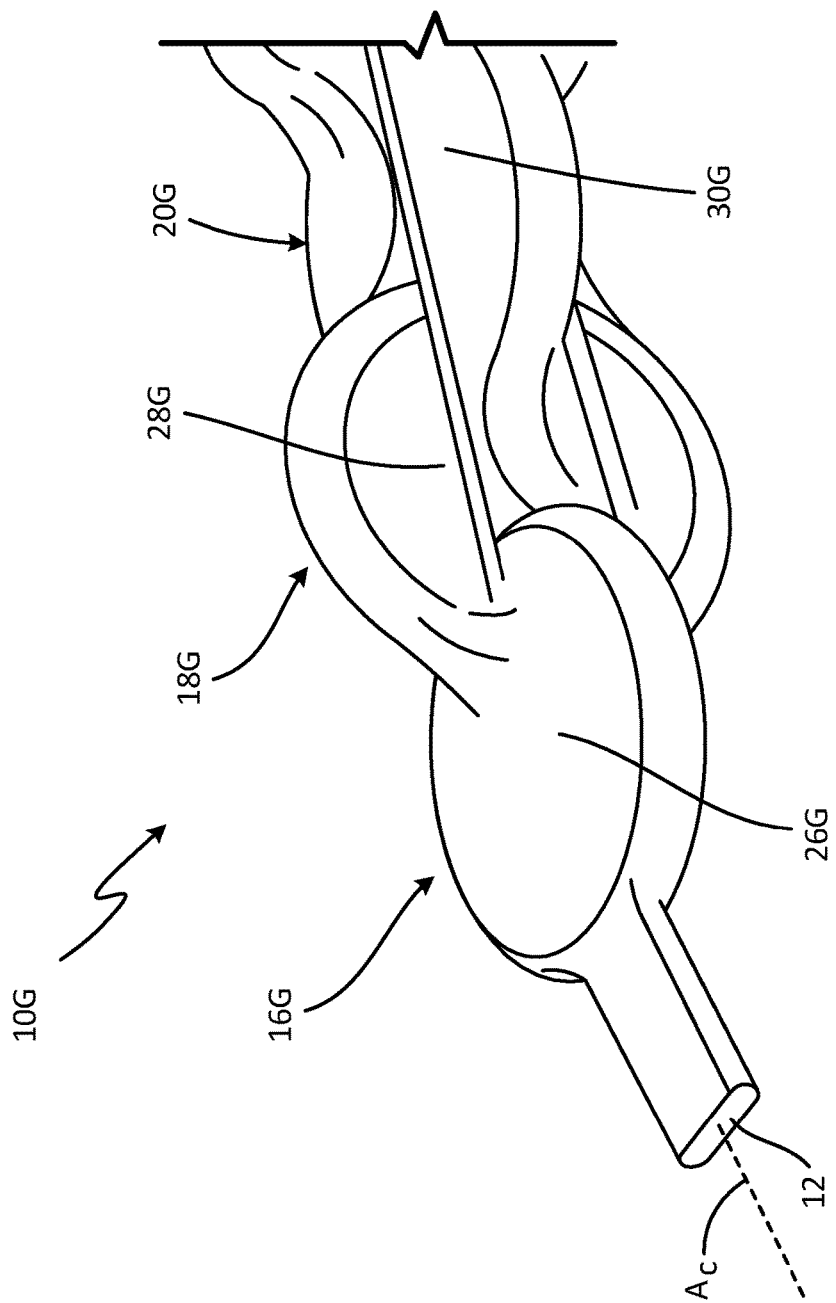
FIG. 2F is perspective view of another embodiment of a core without passages.

Any of cores 10A-10F can be designed to not include any one or all of passages 50, 52, or 54. FIG. 2F shows core 10G which includes no passages through disc shaped structures 16G, 18G, and 20G. As shown, first planar surface 26G and first planar surface 28G are oriented at a non-zero degree angle with respect to each other. The non-zero degree angle can range from about 10 degrees to about 90 degrees. As shown, structures 16G, 18G, and 20G are disc-shaped. In further embodiments structures 16G, 18G, and 20G can take on additional shapes such as a square shape, elongated disc shape, D-shape, or spherical shape.

Cores 10A-10G can be formed from many materials including a ceramic material or a refractory metal or a combination thereof. Cores 10A-10G can be produced using additive manufacturing processes. A suitable additive manufacturing process can include selecting a powdered metal suitable for refractory metal core applications such as molybdenum, or ceramic/ceramic slurry suitable for ceramic core applications, which is fed into an additive manufacturing apparatus. The apparatus deposits multiple layers of powdered metal or ceramic/ceramic slurry onto one another. The layers can be deposited and joined to one another in many suitable ways. For example the powdered metal or ceramic/ceramic slurry can be deposited onto a substrate and melted. The melted metal or ceramic then resolidifies to form a first layer. A second layer of metal or ceramic material is then deposited on top of the first layer. Other additive manufacturing techniques that can be used to form the layers include powder bed techniques and wire feed techniques.

Powder bed methods use a bed of metallic powder that rests on top of a platform to form the layers. A heat source, such as a laser or electron beam, sinters or fuses the metallic powder over the platform. The fused layer becomes the first layer. After the first layer is formed, the platform, along with the first layer, lowers and un-fused powder fills in the void over the first layer. That powder is then sintered or fused to form a second layer. Powder bed methods work well with metals as well as plastics, polymers, composites and ceramics. Wire feed techniques are also suitable to form the first layer. Wire feed techniques differ from powder based techniques in that a wire is fed into the heat source, as opposed to a metallic powder, and melted and solidified to form a layer of additive material. Wire feed techniques can include welding and cold metal fusion.

After the first layer is produced, additional layers can be produced using the same method that formed the previous layer. The apparatus forms each layer with reference to CAD data. The CAD data can relate to a particular cross-section of cores 10A-10G. For example, the CAD data can include geometric data relating to toroidal structures 16, 18, and 20 and passages 50, 52, and 54. With the layers built upon one another and joined to one another cross-section by cross-section, any of cores 10A-10G with the above-described geometries can be produced. A single-piece core can be produced that requires no further assembly and can be directly placed into a mold. Additionally, any of cores 10A-10G can be a hybrid core, in which intricate features, such as toroidal structures 16, 18, and 20 are made of a refractory metal while the remaining features such as first end 12 and second end 14 are made of ceramic materials.

Each of the above described cores 10 can be used to form a flow chamber through a component such as an airfoil or a blade outer air seal. An investment casting process can be used to form the flow chamber using core 10. The investment casting process will be described further below. In short, a component is cast around core 10; core 10 is then removed leaving a flow chamber in the component that is the negative impression of core 10. What was solid (e.g., toroidal structure 16) becomes a hollow chamber and what was hollow (e.g., passage 50) becomes a solid pedestal. The solid pedestal connects one side of the hollow chamber to an opposite side of the hollow chamber and has a central axis that extends through the pedestal in a direction that can be perpendicular to the stacking axis $A_c$ of core 10.

Additional features that can be formed with the above described cores 10 include trip strips or flow guides. That is, any of toroidal structures 16, 18, or 20 can include groves or protrusions. The negative impression of these grooves or protrusions will then form a corresponding feature in the flow chamber. Typically a trip strip is arranged to rotate air in a direction normal to local stream lines and a flow guide is arranged to guide the flow of air to have desired stream lines.

As will be described further below, the flow chambers turbulate a flow of air. The air is turbulated in part by following the contour of the hollow chambers formed by toroidal structures 16, 18, and 20. One way to control the degree to which the air is turbulated is to control the ratio of a maximum cross-sectional area of a toroidal structure, to a minimum cross-sectional area of the toroidal structure, such as a mid-point of the overlapping portion of a toroidal structure and an adjacent toroidal structure. The ratio can range from about 2:1 to about 1:1. For example in toroidal structure 18B (shown in FIG. 2A) the area ratio is approximately 2:1, the maximum area is shown by section line A and the overlapping portion mid-point area is shown by section line B of FIG. 2A. In toroidal structure 18C the area ratio is approximately 1.7:1, the maximum area is shown by section line C and the overlapping portion mid-point area is shown by line D of FIG. 2B. In toroidal structure 18D the area ratio is approximately 1.03:1, the maximum area is shown by section line E and the overlapping portion mid-point area is shown by section line F of FIG. 2C. In toroidal structure 16E the area ratio is approximately 1.06:1, the maximum area is shown by section line G and the overlapping portion mid-point area is shown by section line H of FIG. 2D. If the cross-sectional area varies greatly along toroidal structure 18 such that the area ratio is substantially greater than 1:1, then air passing through an internal chamber formed by toroidal structure 18 will be greatly turbulated and transfer heat very well, but the air will lose pressure. If the area ratio is closer to 1:1, then the air will not transfer heat as well, but the air will lose less pressure as it passes through the flow chamber. This principal applies to all toroidal structures 16, 18, and 20.

The area ratio of each toroidal structure can be controlled using many techniques including varying the diameter of toroidal structure 18, changing the shape of toroidal structure 18, or changing the shape or diameter of passage 52.

Figure 3A:
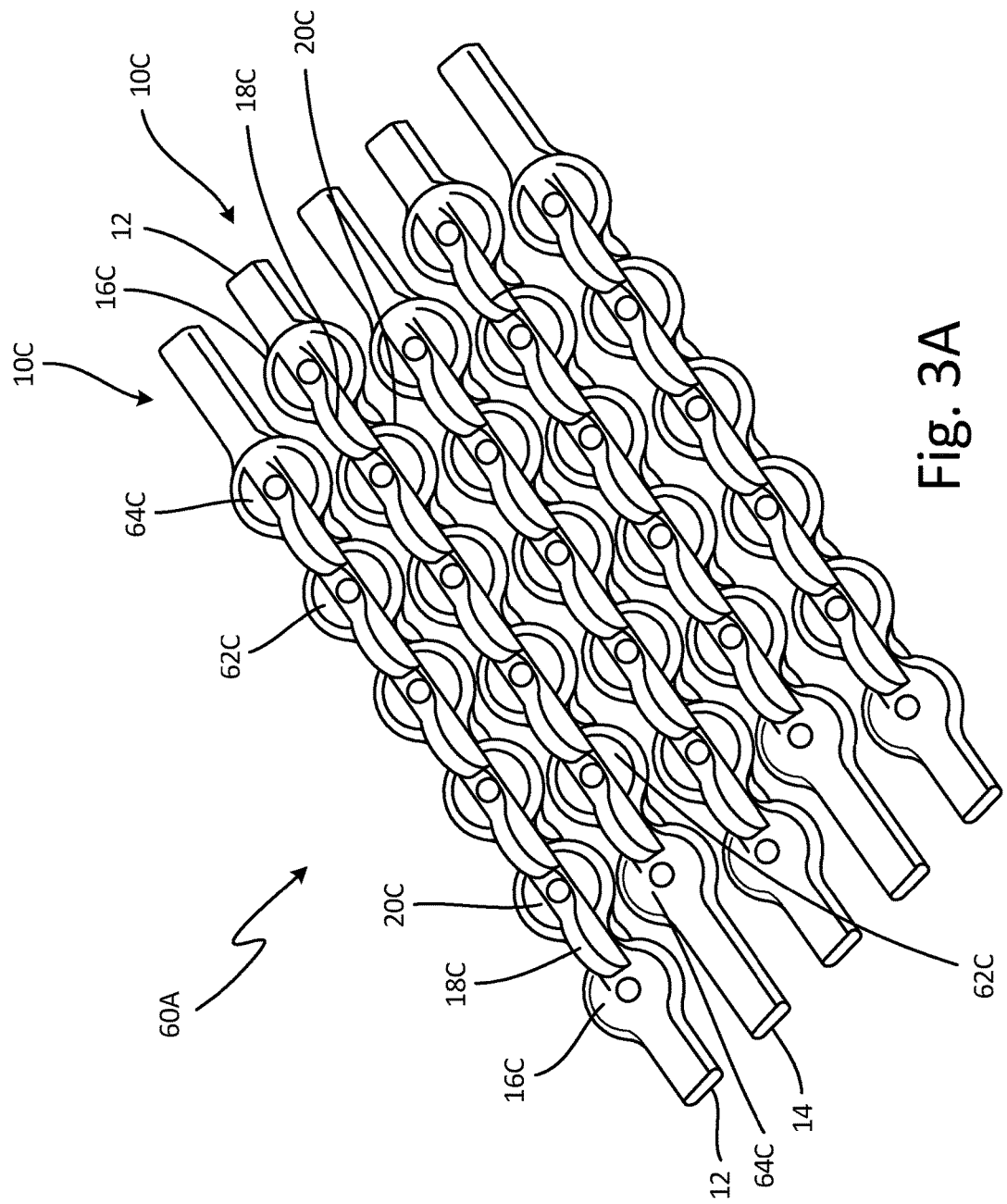
FIG. 3A is a perspective view showing a plurality of cores arranged together for use in an airfoil.
Figure 3C:
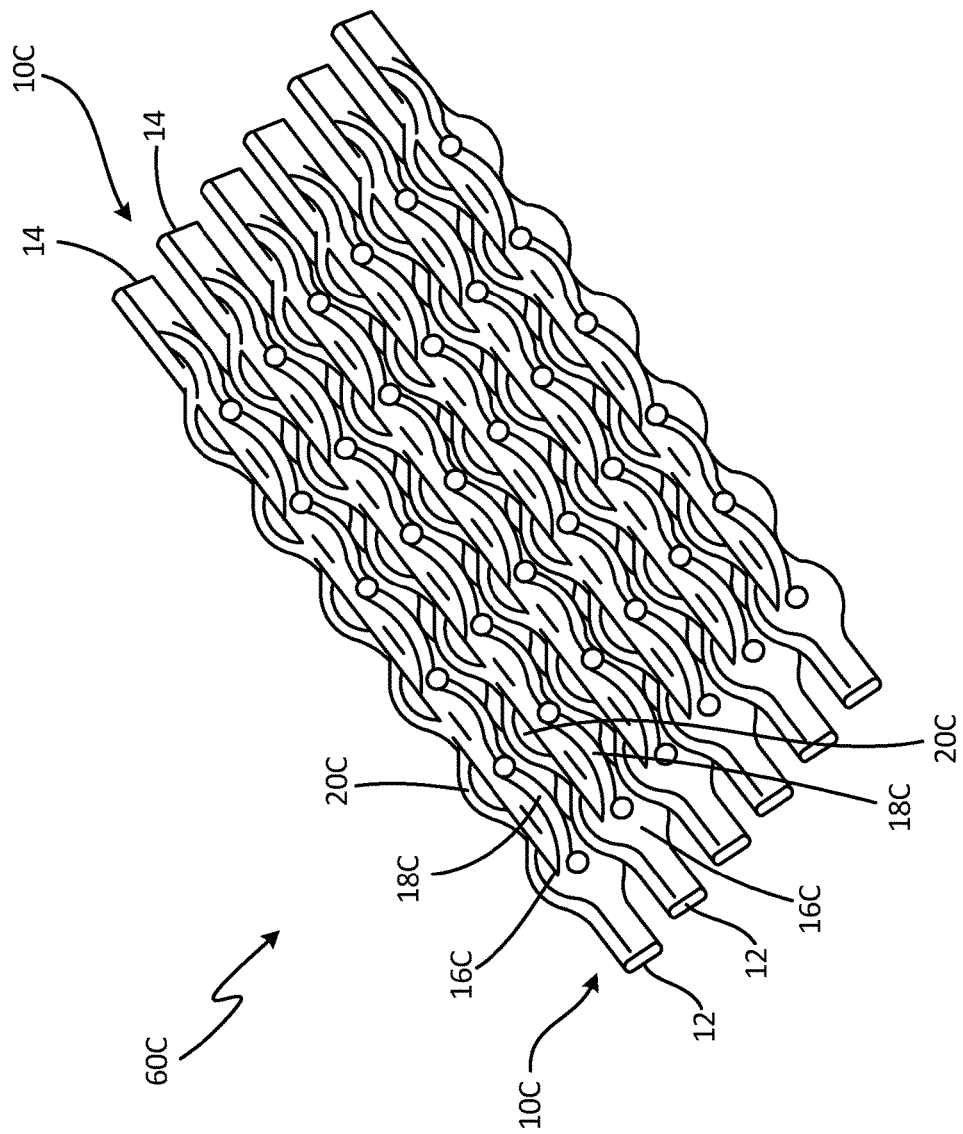
FIG. 3C is a perspective view showing a plurality of closely packed cores.

If a component is designed to have multiple flow chambers, then multiple cores 10 can be arranged to be cast the flow chambers in that component. FIGS. 3A-3C illustrate cores 10C arranged as matrix 60 that ultimately form the flow chambers of a gas turbine engine component.

FIG. 3A shows a plurality of cores similar to core 10C as illustrated in FIG. 2B. and additionally shows toroidal structures 62C and 64C. As illustrated, first end 12 of a first core 10C is aligned with second end 14 of an adjacent second core 10C. As shown toroidal structures 16C and 64C on adjacent cores 10C are staggered with respect to each other. For example toroidal structures 16C are located between second end 14 and toroidal structure 64C of an adjacent core 10C. The staggered arrangement continues in that toroidal structure 20C is aligned between toroidal structures 64C and 62C of an adjacent core 10B and so forth. The arrangement shown in FIG. 3A is representative of one arrangement used to form flow chambers of an airfoil. As depicted, adjacent cores can be arranged to co-flow (in the same direction) or counter-flow (in opposite directions) depending on the available cooling flow supply and cooling requirements.

FIG. 3B shows a plurality of cores similar to core 10C arranged as matrix 60B as illustrated in FIG. 2A. As depicted, projection 66 extends perpendicular to the stacking axis of core 10C. Similar to the arrangement of FIG. 3A, toroidal structures 16C, 18C, 20C, and 64C of adjacent cores 10C are staggered. The arrangement shown in FIG. 3B is representative of one arrangement used to form flow chambers of a blade outer air seal.

FIG. 3C shows a plurality of cores 10C arranged as matrix 60C that differs from the staggered arrangement shown in FIGS. 3A and 3B. As illustrated in FIG. 3C, first ends 12 of adjacent cores 10C are adjacent to each other. Each of toroidal structures 16C are also aligned with an adjacent toroidal structure 16C. That is toroidal structures 16C of adjacent cores 10C are located directly across from each other. Additionally, each of toroidal structures 18C are aligned with an adjacent toroidal structure 18C. This pattern continues for all toroidal structures. As additionally shown, each of cores 10C are rotated approximately 45 degrees with respect to those illustrated in FIG. 3A. This allows adjacent cores 10C to be tightly packed. Though shown arranged on a plane, the pattern can be applied on a contoured surface, for example, following surface contours of an airfoil pressure side.

As stated above, core 10 is used to form flow chambers in a component of a gas turbine engine. As will be described further below, any of cores 10A-10F can be cast into a component. As stated above, once core 10 is removed from the component the negative impression of core 10 forms a flow chamber. Examples of the flow chambers in an airfoil or blade outer air seal formed with cores 10 will be described further below.

Figure 4A:
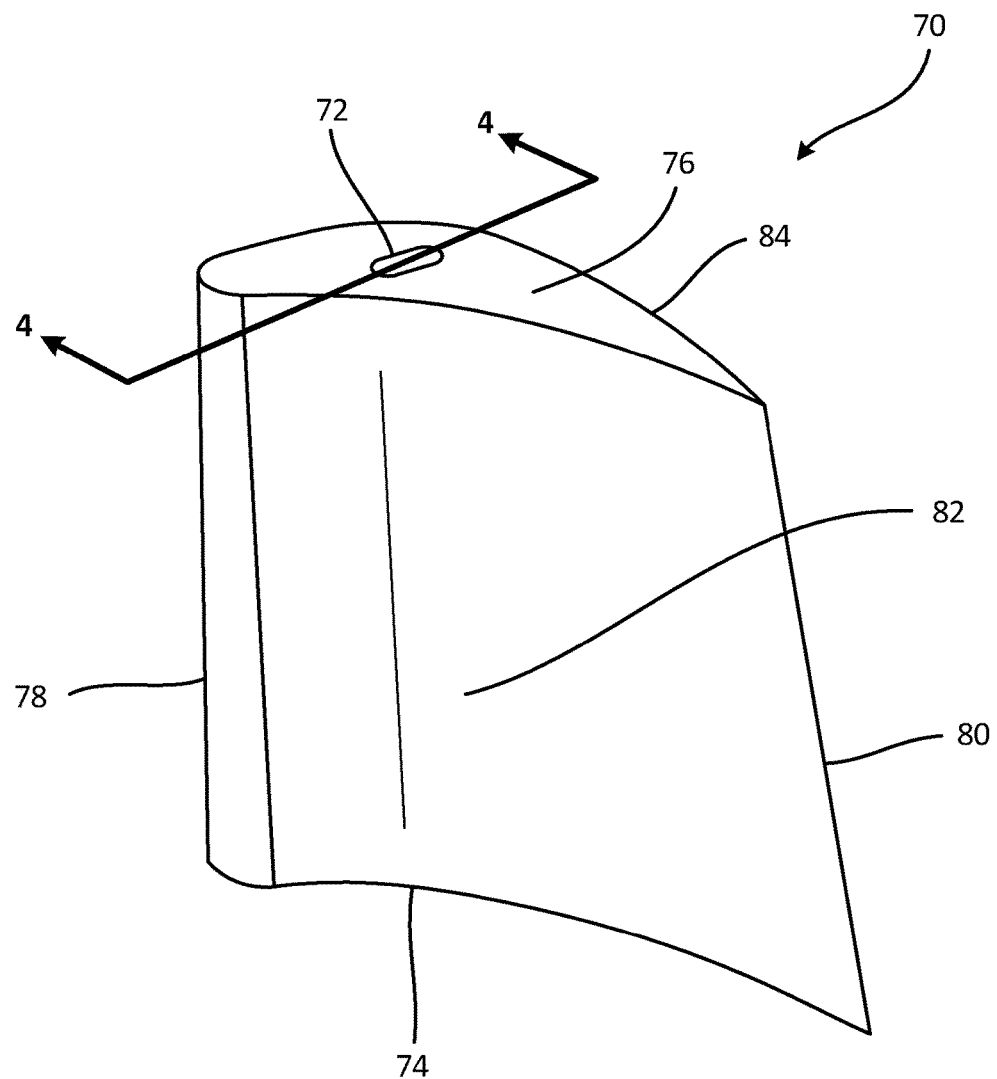
FIG. 4A is a perspective view showing an airfoil having a single flow chamber formed with a core.

FIG. 4A is a perspective view showing airfoil 70. As illustrated airfoil 70 includes flow chamber 72, first end 74, second end 76, leading edge 78, trailing edge 80, pressure surface 82, and suction surface 84.

Airfoil 70 is typical of an airfoil used in a gas turbine engine. For example, airfoil 70 can be used as a rotor blade or a vane in a compressor section or turbine section of the gas turbine engine. Flow chamber 72 extends through airfoil 70 from first end 74 to second end 76. First end 74 can also be referred to as the root of airfoil 70 and second end 76 can be referred to as the tip of airfoil 70. Flow chamber 72 is located between leading edge 78, trailing edge 80, pressure surface 82 and suction surface 84 of airfoil 70.

Figure 4B:
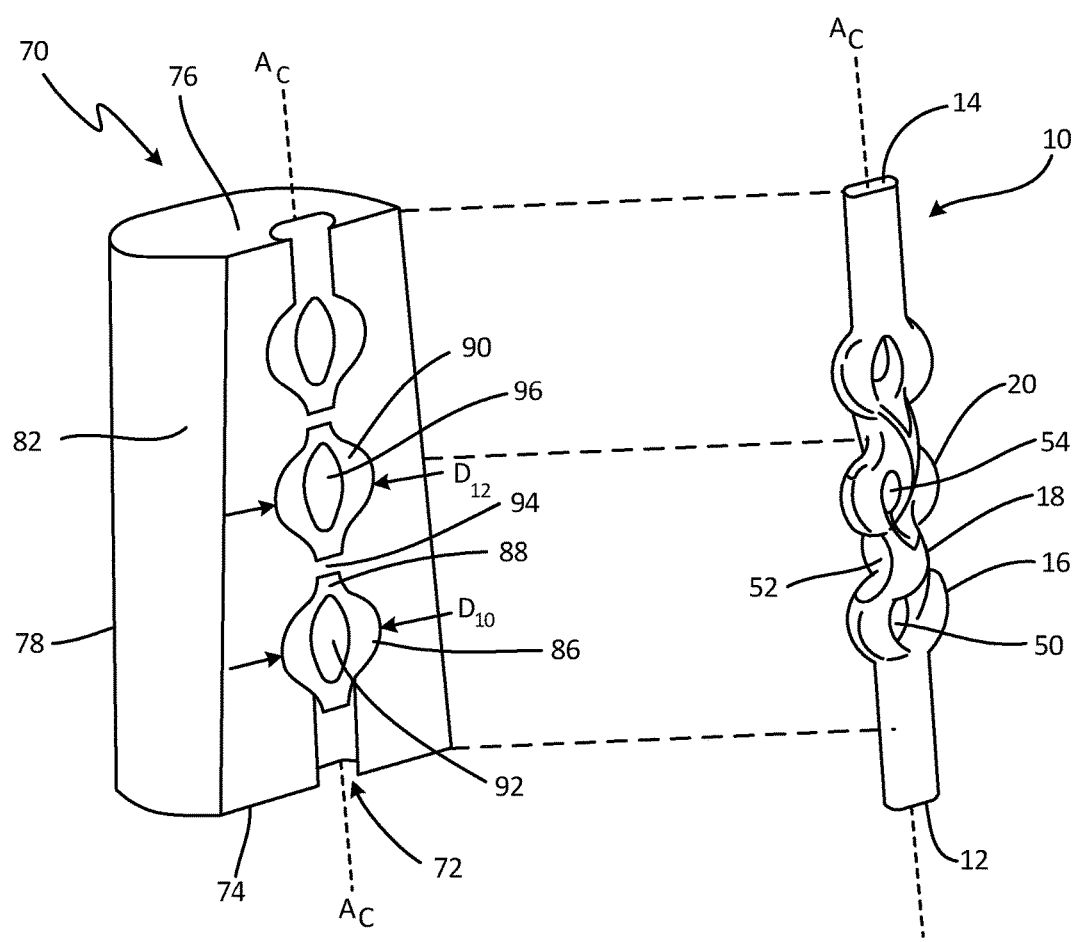
FIG. 4B is a sectional view of the airfoil of FIG. 4A showing the single flow chamber and the core forming the passage.

FIG. 4B is a sectional view of airfoil 70 of FIG. 4A taken along section line 4-4. FIG. 4B shows flow chamber 72. To aid the reader, core 10 is also shown in perspective not in cross-section. FIG. 4B shows many of the features of FIG. 4A and further shows chamber 86, chamber 88, and chamber 90; pedestal 92, pedestal 94, and pedestal 96.

Flow chamber 72 extends between first end 74 of airfoil 70 and second end 76 of airfoil 70. Chamber 86 is located near first end 74. To form chamber 86, walls of flow chamber 72 diverge away from each other in a first direction that is perpendicular to the stacking axis $A_c$ to form a major diameter $D_{10}$. As shown, chamber 86 is rounded to have a substantially toroidal disc shaped profile and is the negative impression of toroidal structure 16 of core 10. In other embodiments, chamber 86 can have other shapes such as an elongated toroidal disc shape or toroidal spherical shape.

Pedestal 92 extends through stacking axis $A_c$ in a second direction perpendicular to the first direction. Pedestal 92 connects opposite sides of chamber 86. Pedestal 92 has an elliptical profile and is the negative impression of passage 50 of core 10. In other embodiments pedestal 92 can have other shapes such as a circular profile.

Chamber 88 is located between chamber 86 and second end 76. Chamber 88 is formed, in part, by the walls of flow chambers diverging in the second direction to form a major diameter (not shown). The first direction and the second direction are oriented at a non-zero degree angle with respect to each other. The non-zero degree angle at which the first direction and the second direction are oriented can range from about 10 degrees to about 90 degrees. As shown the first direction and the second direction are arranged at a 90 degree angle. In other embodiments the non-zero degree angle can be about 45 degrees. Chamber 88 is rounded to have a substantially toroidal disc shaped profile and is the negative impression of toroidal structure 18 of core 10. In other embodiments, chamber 88 can have other shapes such as an elongated toroidal disc shape or toroidal spherical shape.

Pedestal 94 extends through stacking axis $A_c$ in the first direction (perpendicular to the second direction). Pedestal 94 connects opposite sides of chamber 88. As stated above, the first direction and the second direction are oriented at a non-zero degree angle with respect to each other and can range from about 10 degrees to about 90 degrees. As shown the first direction and the second direction are arranged at a 90 degree angle. In other embodiments the non-zero degree angle can be about 45 degrees. Pedestal 94 has an elliptical profile and is the negative impression of passage 52 of core 10. In other embodiments pedestal 94 can have other shapes such as a circular profile.

Chamber 90 is located between chamber 88 and second end 76. Chamber 90 is formed, in part, by the walls of flow chamber 72 diverging in the first direction to form a major diameter $D_{12}$. Pedestal 96 extends through stacking axis $A_c$ in the second direction. Pedestal 96 connects opposite sides of internal chamber. Pedestal 96 has an elliptical profile and is the negative impression of passage 54 of core 10. In other embodiments pedestal 96 can have other shapes such as a circular profile.

FIG. 4B also illustrates additional chambers that are structurally similar to chambers 86, 88 and 90. FIG. 4B also illustrates additional pedestals that are structurally similar to pedestal 92, 94, and 96.

In operation, a flow of air is passed through flow chamber 72. Typically, the air flows from first end 74 of airfoil 70 to second end 76 of airfoil 70. But air can also flow from second end 76 to first end 74 in other embodiments. Typically the air is tapped from a source of pressurized air. For example, the air can be tapped from a compressor section of the gas turbine engine.

After entering flow chamber 72 the flow of air enters chamber 86 where it encounters pedestal 92. The flow of air is then divided and turned outward towards the walls of chamber 86. The divided flow of air re-converges, exits chamber 86, enters chamber 88, and encounters pedestal 94, which again divides the flow of air and rotates the flow of air to turn outward towards the walls of chamber 88. The divided flow of air re-converges, exits chamber 88, enters chamber 90, and encounters pedestal 96, which again divides the flow of air and rotates the flow of air to turn outward towards the walls of chamber 90.

In other embodiments of airfoil 70, holes can be formed through leading edge 78, trailing edge 80, pressure surface 82, or suction surface 84 to extend into flow chamber 72 such that a portion of the flow of air can be expelled and cool leading edge 78, trailing edge 80, pressure surface 82, and/or suction surface 84 of airfoil 70 through film cooling. Additionally, in other embodiments airfoil 70 can include multiple flow chamber 72 that are fed air from a common source. Alternatively, if airfoil 70 includes multiple flow chambers, the passages can be linked to create a serpentine path for the flow of air to follow.

Figure 5:
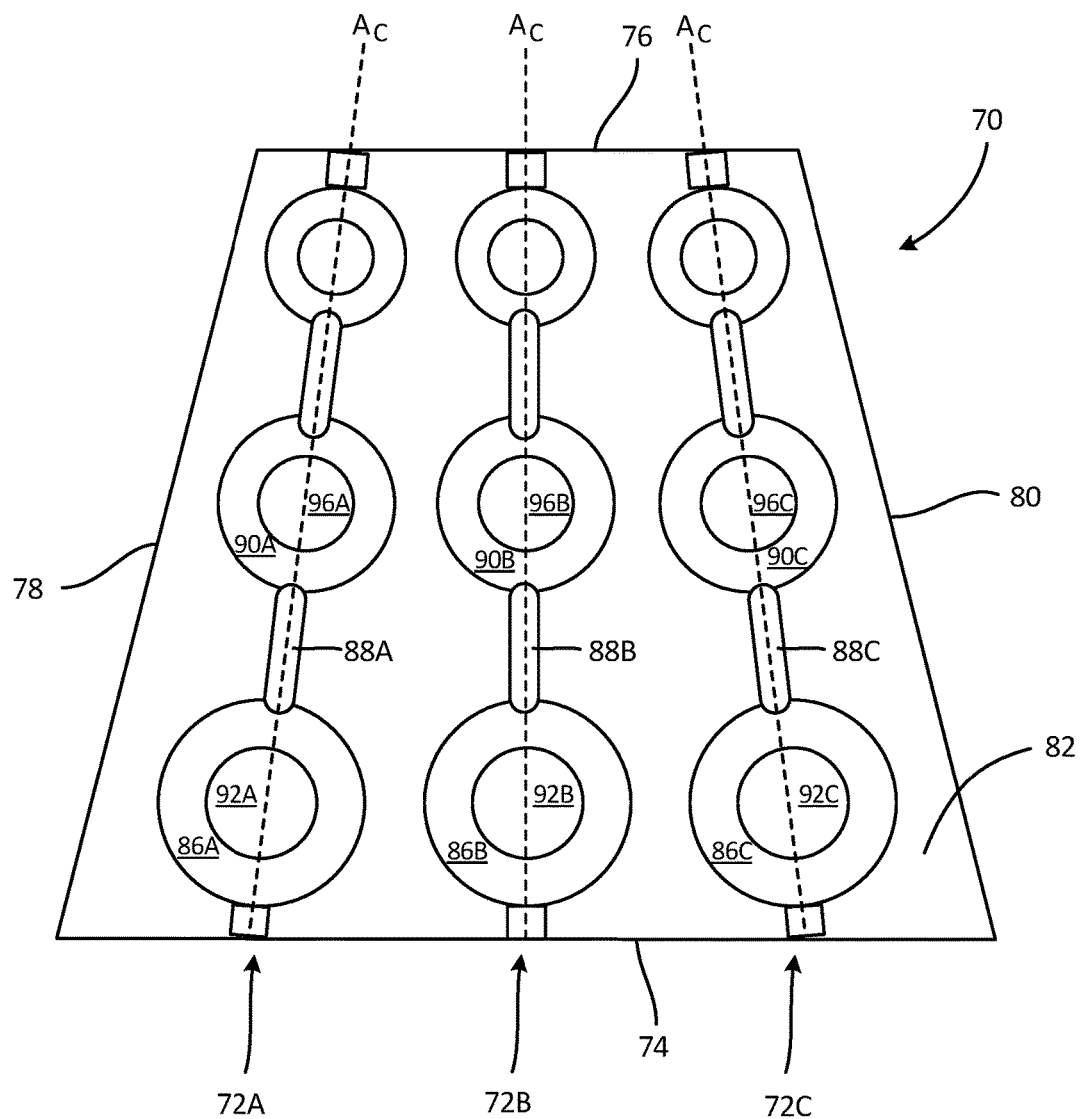
FIG. 5 is a sectional view of an airfoil showing a plurality of flow chambers decreasing in size in a radial direction

Flow chamber 72 can take on additional configurations that are suited to be adapted to various airfoils 70. FIG. 5 is schematic sectional view that shows airfoil 70 including chambers 86, 88, and 90. As illustrated, leading edge 78 and trailing edge 80 are tapered from first end 74 to second end 76. Stacking axis $A_c$ of flow chamber 72A is aligned to be commensurate with the degree to which leading edge 78 is tapered. Additionally, each of chambers 86, 88, and 90 decreases in size from first end 74 to second end 76. Chambers 86, 88, and 90 of flow chambers 72A, 72B, and 72C decrease in size from first end 74 to second end 76 of flow chamber 72C is aligned to be commensurate with the degree to which trailing edge 80 is tapered.

In addition to flow chamber 72A and 72C being aligned with leading edge 78 and trailing edge 80, either passage including flow chamber 72B can be curved to match the contour of leading edge 78, trailing edge 80, pressure surface 82 or suction surface 84 of airfoil 70. Additionally, each of chambers 86, 88, and 90 can be individually sized to better fit within airfoil 70. A flow of air passes through chambers 86, 88, and 90 in a manner similar to that described with respect to flow chamber 72 described above with respect to FIG. 5.

Figure 6:
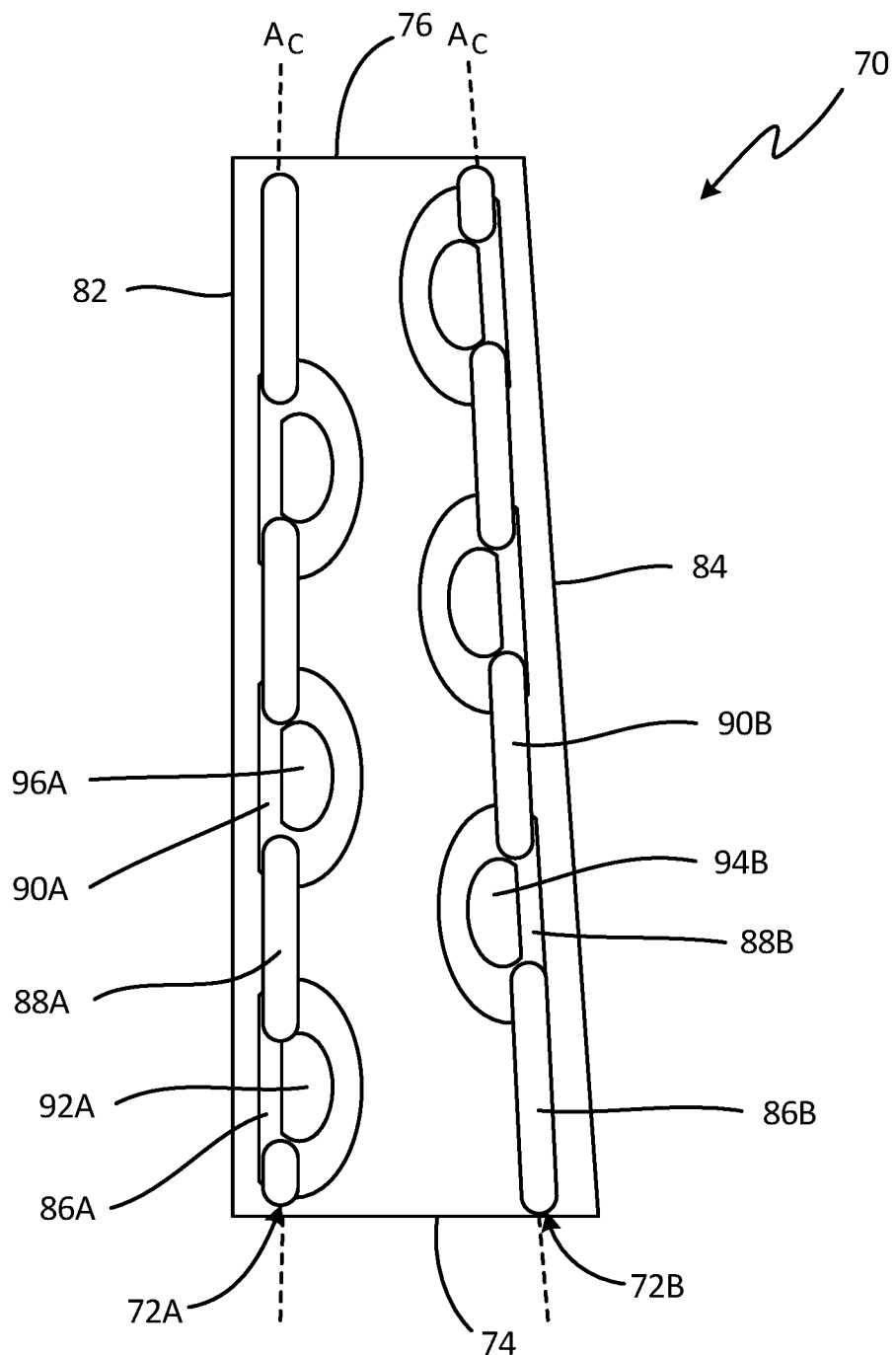
FIG. 6 is a sectional view of an airfoil showing a passage at each of the pressure and suction sides having chambers that are offset from a stacking axis of the passage.

FIG. 6 is a schematic sectional view of airfoil 70 showing flow chambers 72A and 72B. As shown, chamber 86A is disposed near pressure surface 82 and chamber 86B is disposed near suction surface 84. As shown, first flow chamber 72A includes chambers 86A, 88A, and 90A. Of those chambers at least chambers 86A and 90A have an asymmetrical D-shaped generally toroidal cross-section such that a central portion of chambers 86A and 90A are offset from stacking axis $A_c$ as shown in FIG. 6. To form this version of flow chamber 72A, toroidal structures 16 and 20 would have to be offset from stacking axis $A_c$ of core 10. Chamber 88A can be D-shaped or take on any previously disclosed shape. Additionally, pedestal 92A is offset from stacking axis $A_c$. Similarly, second flow chamber 72B includes chambers 86B, 88B, and 90B. Of those chambers at least chamber 88B is substantially D-shaped. Additionally, a center of pedestal 94B is offset from stacking axis $A_c$. Chamber 88B can be D-shaped or take on any previously disclosed shape. Each of internal chambers 86, 88, and 90 can be configured to conform to the contour of pressure surface 82 or suction surface 84. A flow of air passes through chambers 86, 88, and 90 in a manner similar to that described with respect to flow chamber 72 described above with respect to FIGS. 4A and 4B. FIGS. 4A, 4B, 5, and 6. Flow chamber 72 can also be disposed in other components of a gas turbine engine. For example, flow chamber 72 can also be disposed in a blade outer air seal.

Figure 7A:
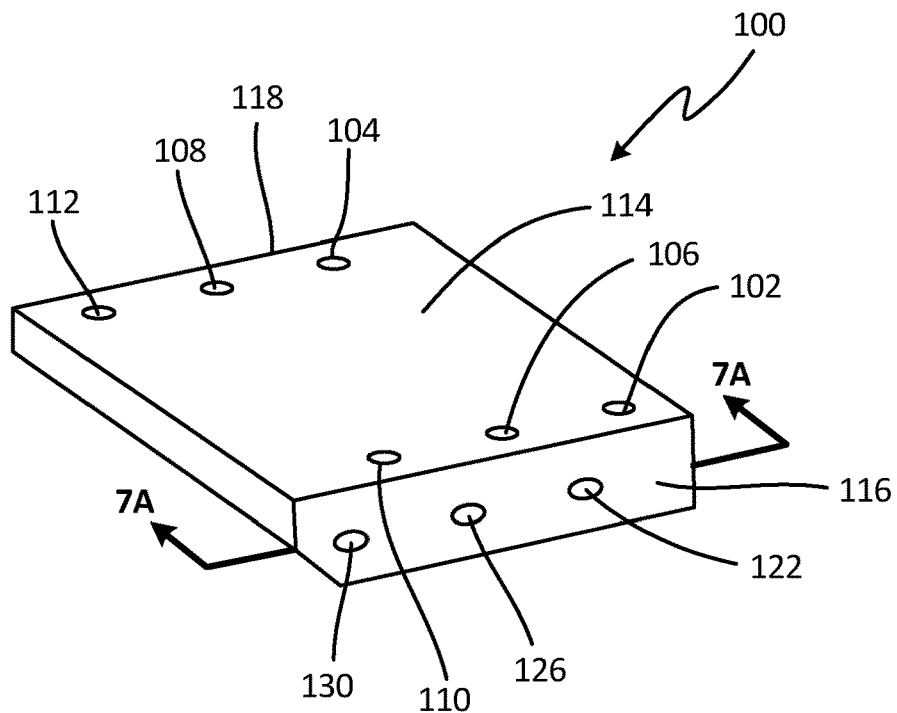
FIG. 7A is a perspective view of a blade outer air seal having a plurality of internal cooling passages.
Figure 7B:
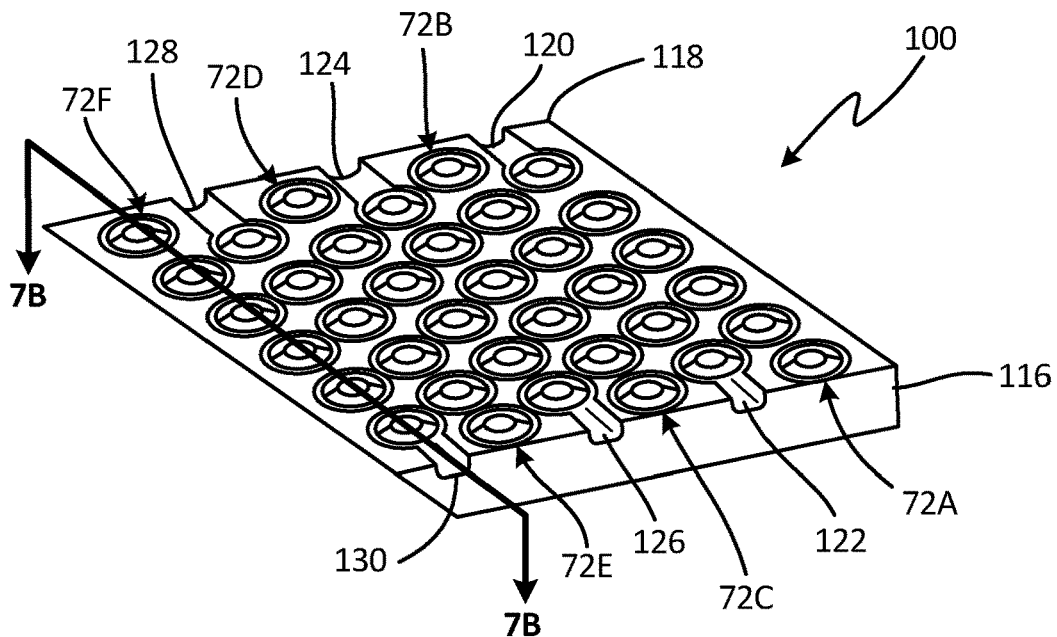
FIG. 7B is a sectional view of the blade outer air seal of FIG. 7A showing a plurality of passages formed by a plurality of cores.
Figure 7C:
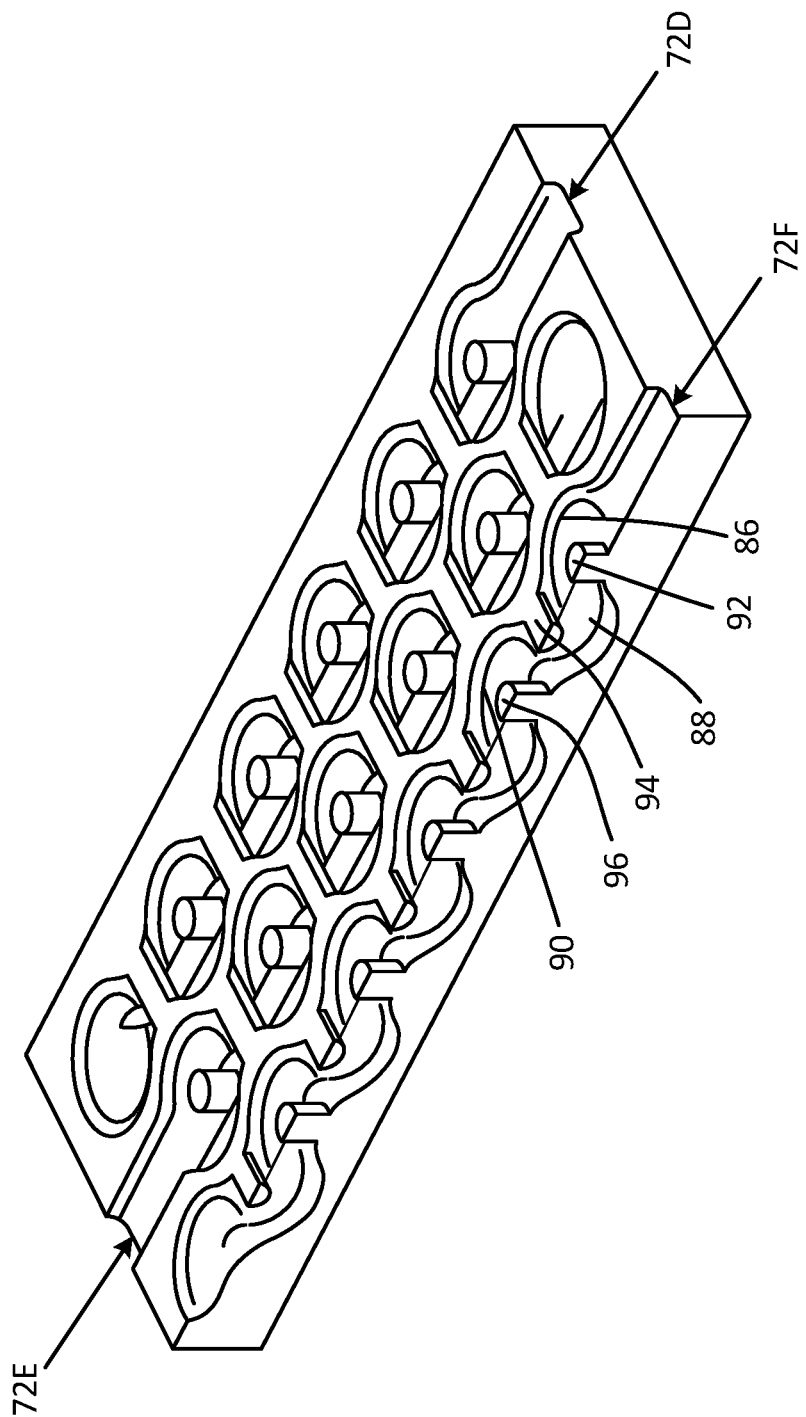
FIG. 7C is a sectional view of the blade outer air seal of FIGS. 7A and 7B showing a plurality of passages formed by a plurality of cores

FIGS. 7A and 7B illustrate a blade outer air seal. Blade outer air seal 100 includes air inlets 102, 104, 106, 108, 110, and 112; top surface 114, first side surface 116, second side surface 118, air outlet 120, air outlet 122, air outlet 124, air outlet 126, air outlet 128, and air outlet 130.

Air inlets 102, 104, 106, 108, 110, and 112 are located on top surface 114 and air outlets 120, 122, 124, 126, 128, and 130 are located on side surfaces 116 and 118. Air inlet 102 is associated with air outlet 120 (shown in FIG. 7B) on second side surface 118. Air inlet 104 is associated with air outlet 122 on first side surface 116. Air inlet 106 is associated with air outlet 124 (shown in FIG. 7B) on second side surface 118. Air inlet 108 is associated with air outlet 126 on first side surface 116. Air inlet 110 is associated with air outlet 128 (shown in FIG. 7B) on second side surface 118. Air inlet 112 is associated with air outlet 130 on first side surface 116. Air inlets 102, 104, 106, 108, 110, and 112 are formed from projections 66, which are illustrated above with respect to FIG. 3B. Air outlets 120, 122, 124, 126, 128, and 130 are formed from alternating first and second ends 12 and 14 shown above in FIG. 3B.

In operation, cooling air such as the tapped air described above with respect to FIGS. 4A and 4B above enters each of air inlets 102, 104, 106, 108, 110, and 112. Cooling air then passes through flow chambers 72A-72F and exits air outlets 120, 122, 124, 126, 128, and 130. Flow chambers 72A-72F are structurally similar to flow chamber 72 shown above with respect to FIGS. 4A, 4B, 5, and 6. Flow chambers 72A-72F are described in further detail below with respect to FIG. 7A.

FIG. 7B is a sectional view of blade outer air seal 100 taken along section line 7-7 of FIG. 7A. FIG. 7B also shows air outlets 120, 124, and 128. FIG. 7B also shows many of the features as described above with respect to FIGS. 4A and 4B. The flow of cooling air passes through each of flow chambers 72A-72F in a similar manner that cooling air passes through flow chamber 72 as described above with respect to FIG. 4B.

Figure 8:
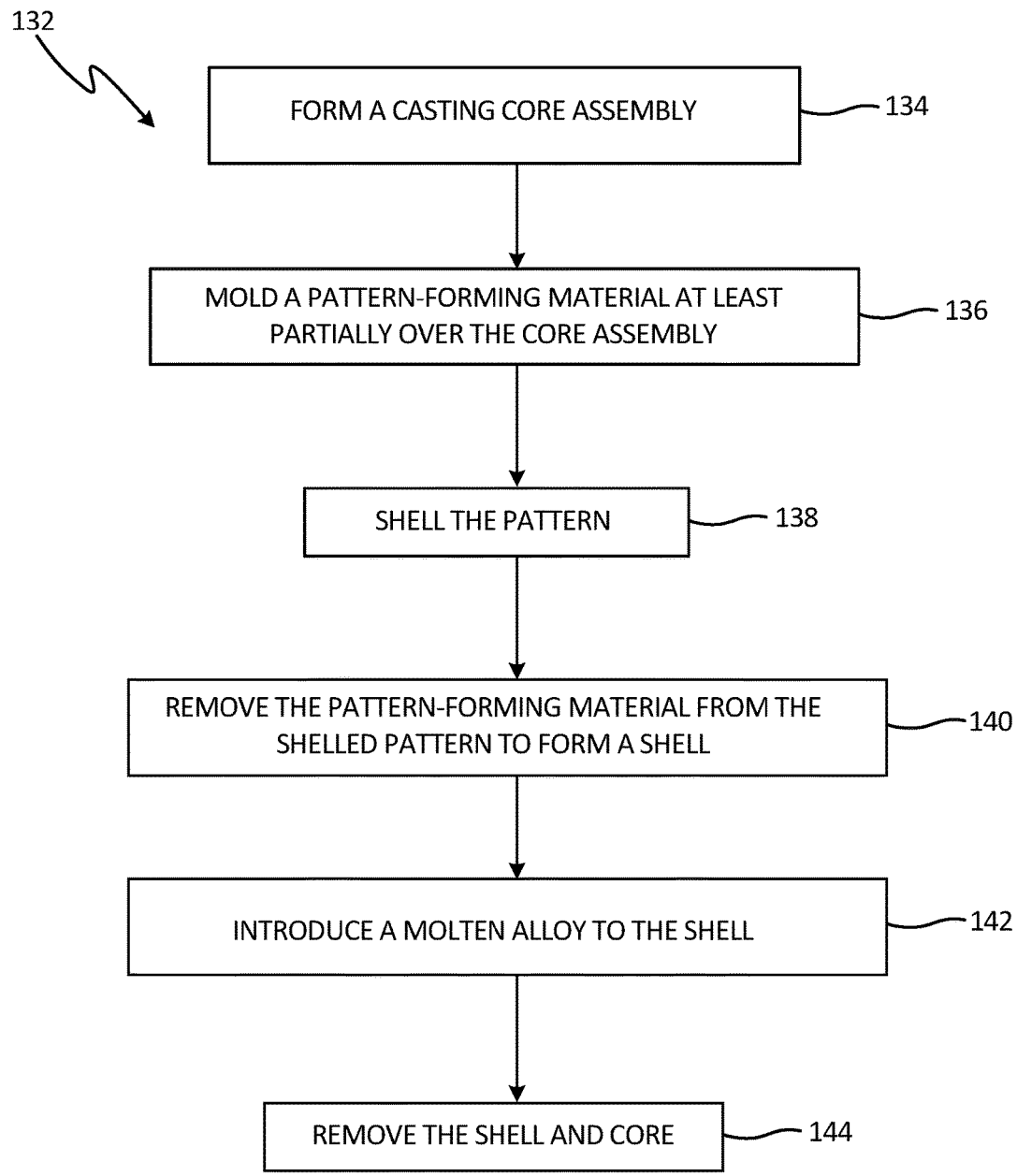
FIG. 8 is a flow diagram illustrating a method of forming a gas turbine engine component.

Flow chamber 72 of airfoil 70 or blade outer air seal 100 can be formed by an investment casting procedure. FIG. 8 is a flow diagram showing an embodiment of a method for forming a gas turbine engine component such as airfoil 70 or blade outer air seal 100. Method 132 includes core formation step 134, molding step 136, shelling step 138, removal step 140, metal introduction step 142, and removal step 144.

In core formation step 134 core 10 is formed. As described above, core 10 can be formed through an additive manufacturing process or by solidifying a ceramic slurry in a core die. In molding step 136 a sacrificial pattern-forming material, such as a wax, is molded at least partially over core 10 so as to form a casting pattern. In shelling step 138 the pattern is shelled. In removal step 140 the pattern-forming material is removed. In metal introduction step 142, a molten alloy (e.g., a chromium based, nickel based, or titanium based superalloy) is poured into the shell. In removal step 144 the shell and core 10 assembly are removed thus producing a component such as airfoil 70 or blade outer air seal 100 with flow chamber 72.

The component can also be formed to include flow chamber 72 without using core 10 in conjunction with an investment casting process. That is, the component can be additively manufactured. For example, a powdered metal suitable for aerospace applications or a ceramic slurry is fed to a machine. The machine can deposit multiple layers of powdered metal or ceramic material onto one another. The layers can be joined to one another with reference to CAD data, which relates to a particular cross-section of the component including geometrical data for flow chamber 72. The powdered metal or ceramic slurry can be melted and deposited as a layer in conjunction with the processes described above with respect to core 10. With the layers built upon one another and joined to one another cross-section by cross-section, the component with the above-described flow chamber 72 can be produced.

There are many reasons to use core 10 or a component having flow chamber 72. First, core 10 and flow chamber 72 make it possible to direct air within flow chamber 72 in three dimensions. The ability to turbulate a flow of air passing through flow chamber 72 can increase the heat transfer characteristics of the flow of air compared to flow chambers that can only direct air in two dimensions.

Another reason to use core 10 or flow chamber 72 is that the geometry of core 10 or flow chamber 72 can be easily tuned to suit particular applications. As described above, the ratio of the maximum to minimum area of a toroidal section, and resulting chamber, can be easily tuned. This allows core 10 or flow chamber 72 to be designed so that overall area ratio (taken across each toroidal section) is high, which will cause the air flow to decrease in pressure but increases heat transfer rates from the air flow. This can be desirable if the air flow received by the component is at a substantially high pressure that needs to be reduced. Core 10 or flow chamber 72 can also be designed so the area ratio is closer to a 1:1 ratio such that the air flow has desirable heat transfer characteristics while minimizing any associate pressure loss.

The geometry of core 10 and flow chamber 72 can be further altered to suit particular applications. For example, flow chamber 72 as described above with respect to FIG. 5 are aligned to conform to the shape of airfoil 70. This can allow for flow chambers 72 to be very close to either pressure surface 82 or suction surface 84 of airfoil 70 where external temperatures may be greatest. Similarly, flow chamber 72 as described above with respect to FIG. 6 allow flow chamber 72 to be even closer to pressure surface 82 or suction surface 84. Additionally, toroidal structures 16, 18, 20, 62, and 64 or chambers 86, 88, and 90 can be designed to have different sizes from one another. For example, FIG. 5 shows chamber 90 and pedestal 96 as having a smaller diameter than any of chambers 86 or 88 or pedestals 92 and 94. This allows a component such as airfoil 70 to accommodate multiple flow chambers 72 at second end 76, if second end 76 is smaller than first end 74 as shown with respect to FIG. 5.

Additionally, the ability to rotate toroidal structures and pedestals at various angles allows for cores 10 to be strategically stacked together. For example, FIGS. 3A-3C show various stacks or matrices of cores 10. The ability to stagger cores 10 or rotate adjacent cores 10 with respect to each other allows many cores 10 to be located together without taking up excessive space in the component.

Thus, core 10 and flow chamber 72 can be designed to fit within a variety of spatial confines of a component while still providing a flow of cooling air that is rotated while passing through flow chamber 72.

Discussion of Possible Embodiments

The following are non-exclusive descriptions of possible embodiments of the present invention.

A core according to an exemplary embodiment of this disclosure, among other possible things includes a first end; a second end spaced generally opposite from the first end; a stacking axis defined between the first end and second end; a first toroidal structure located between the first end and the second end, the first toroidal structure comprising: a first passage extending through the first toroidal structure in a first direction that is perpendicular to and passes through the stacking axis; and a second toroidal structure located between the first toroidal structure and the second end the second toroidal structure, comprising: a second passage extending through the second toroidal structure in a second direction; wherein, the first direction and the second direction are oriented along the stacking axis at a non-zero degree angle with respect to each other.

The core of the preceding paragraph can optionally include, additionally and/or alternatively, any one or more of the following features, configurations and/or additional components:

A further embodiment of the foregoing core, wherein the first toroidal structure can include a first planar surface; a second planar surface opposite the first surface; and a side surface connecting the first planar surface and second planar surface.

A further embodiment of the foregoing core wherein the first toroidal structure can have a substantially spherical toroidal shape.

A further embodiment of the foregoing core wherein the first passage and the second passage can be oriented along the stacking axis at an angle ranging from about 10 degrees to about 90 degrees with respect to each other.

A further embodiment of the foregoing core wherein the first passage and the second passage can be oriented along the stacking axis at an angle ranging from about 30 degrees to about 60 degrees with respect to each other.

A further embodiment of the foregoing core wherein the first passage and the second passage can be oriented along the stacking axis at an angle of about 45 degrees with respect to each other.

A further embodiment of the foregoing core wherein the core can include a third toroidal structure having a substantially toroidal shape and located between the second toroidal structure and the second end, comprising a third passage extending perpendicular to and passing through the stacking axis and through the third toroidal structure in a direction substantially parallel to the first direction.

A further embodiment of the foregoing core wherein the second direction that the second passages can extend through is perpendicular to and passes through the stacking axis.

A component for a gas turbine engine according to an exemplary embodiment of this disclosure, among other possible things includes a first end; a second end generally opposite the first end; a flow chamber disposed along a stacking axis between the first end and the second end and defined by an internal surface of the component, the flow chamber comprising: a first chamber located at the first end and having a substantially toroidal cross section; a second chamber located between the first chamber and the second end and having a toroidal cross section; a first pedestal extending through a central portion of the first chamber in a first direction; and a second pedestal extending through a central portion of the second chamber in a second direction, wherein the first direction and the second direction are oriented at a non-zero degree angle with respect to each other.

The component for a gas turbine engine of the preceding paragraph can optionally include, additionally and/or alternatively, any one or more of the following features, configurations and/or additional components:

A further embodiment of the foregoing component wherein the first pedestal and the second pedestal can be oriented at an angle ranging from about 10 degrees to about 90 degrees with respect to each other.

A further embodiment of the foregoing component wherein the first pedestal and the second pedestal can be oriented at an angle ranging from about 30 degrees to about 60 degrees with respect to each other.

A further embodiment of the foregoing component wherein the first pedestal and the second pedestal can be oriented at an angle of about 45 degrees with respect to each other.

A further embodiment of the foregoing component wherein the component can be selected from the group consisting of an airfoil and a blade outer air seal.

A further embodiment of the foregoing component wherein a volume encompassed by the first chamber can be substantially equal to a volume encompassed by the second chamber.

A further embodiment of the foregoing component wherein the first pedestal can be substantially cylindrically shaped.

A further embodiment of the foregoing component wherein a ratio of a diameter of the first chamber to a diameter of the first pedestal can range from approximately 4:1 to approximately 2:1.

A further embodiment of the foregoing component wherein the component can further include a third chamber having a substantially toroidal cross section and located between the second chamber and the second end and a third pedestal extending through a central portion of the third chamber in a third direction.

A further embodiment of the foregoing component wherein the first direction and the third direction can be substantially parallel to each other.

A further embodiment of the foregoing component wherein the first pedestal can extend perpendicular to and through the stacking axis.

A core according to an exemplary embodiment of this disclosure, among other possible things includes a first end; a second end spaced opposite from the first end; a stacking axis extending through the first end and the second end; a first disc located between the first end and the second end, the first disc having a first generally planar surface; and a second disc located between the first disc and the second end, the second disc having a second generally planar surface; wherein the first generally planar surface and the second generally planar surface are oriented along the stacking axis at a non-zero degree angle with respect to each other.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A core comprising:
   a first end;
   a second end spaced generally opposite from the first end;
   a stacking axis defined between the first end and second end;
   a first toroidal structure located between the first end and the second end, the first toroidal structure comprising:
      a first passage extending through the first toroidal structure in a first direction that is perpendicular to and passes through the stacking axis; and
   a second toroidal structure located between the first toroidal structure and the second end the second toroidal structure, comprising:
      a second passage extending through the second toroidal structure in a second direction;
   wherein, the first direction and the second direction are oriented along the stacking axis at a non-zero degree angle with respect to each other.

2. The core of claim 1, wherein the first toroidal structure further comprises:
   a first planar surface;
   a second planar surface opposite the first surface; and
   side surfaces connecting the first planar surface and second planar surface.

3. The core of claim 1, wherein the first toroidal structure has a substantially spherical toroidal shape.

4. The core of claim 1, wherein the first passage and the second passage are oriented along the stacking axis at an angle ranging from 10 degrees to 90 degrees with respect to each other.

5. The core of claim 4, wherein the angle ranges from 30 degrees to 60 degrees.

6. The core of claim 5, wherein the first passage and a radial passage of the second passage are oriented along the stacking axis at an second angle of 45 degrees with respect to each other.

7. The core of claim 1, and further comprising:
   a third toroidal structure located between the second toroidal structure and the second end, comprising:
      a third passage extending perpendicular to and passing through the stacking axis through the third toroidal structure in a direction substantially parallel to the first direction.

8. The core of claim 1, wherein the second direction is perpendicular to and passes through the stacking axis.

9. A component for a gas turbine engine comprising:
   a first end;
   a second end generally opposite the first end;
   a flow chamber disposed along a stacking axis between the first end and the second end and defined by an internal surface of the component, the flow chamber comprising:
      a first chamber located at the first end and having a substantially toroidal cross section;
      a second chamber located between the first chamber and the second end and having a toroidal cross section;
      a first pedestal extending through a central portion of the first chamber in a first direction; and
      a second pedestal extending through a central portion of the second chamber in a second direction, wherein the first direction and the second direction are oriented at a non-zero degree angle with respect to each other.

10. The component of claim 9, wherein the first pedestal and the second pedestal are oriented at an angle ranging from 10 degrees to 90 degrees with respect to each other.

11. The component of claim 10, wherein the angle ranges from 30 degrees to 60 degrees.

12. The component of claim 11, wherein the angle is 45 degrees.

13. The component of claim 9, wherein the component is selected from the group consisting of an airfoil and a blade outer air seal.

14. The component of claim 9, wherein a volume encompassed by the first chamber is substantially equal to a volume encompassed by the second chamber.

15. The component of claim 9, wherein the first pedestal is substantially cylindrically shaped.

16. The component of claim 9, wherein a ratio of a diameter of the first chamber to a diameter of the first pedestal ranges from 4:1 to 2:1.

17. The component of claim 9, and further comprising:
   a third chamber having a substantially toroidal cross section and located between the second chamber and the second end; and
   a third pedestal extending through a central portion of the third chamber in a third direction.

18. The component of claim 17, wherein the first direction and the third direction are substantially parallel to each other.

19. The component of claim 9, wherein the first pedestal extends perpendicular to and through the stacking axis.

20. A core comprising:
   a first end;
   a second end spaced opposite from the first end;
   a stacking axis extending through the first end and the second end;
   a first disc located between the first end and the second end, the first disc having a first generally planar surface; and
   a second disc located between the first disc and the second end, the second disc having a second generally planar surface;
   wherein the first generally planar surface and the second generally planar surface are oriented along the stacking axis at a non-zero degree angle with respect to each other.

* * * * *